United States Patent
Wegelin et al.

(10) Patent No.: US 11,409,021 B2
(45) Date of Patent: Aug. 9, 2022

(54) SENSOR FOR DISPENSING SYSTEM

(71) Applicant: GOJO Industries, Inc., Akron, OH (US)

(72) Inventors: Jackson William Wegelin, Stow, OH (US); Chip Curtis, West Dundee, IL (US)

(73) Assignee: GOJO Industries, Inc., Akron, OH (US)

( * ) Notice: Subject to any disclaimer, the term of this patent is extended or adjusted under 35 U.S.C. 154(b) by 57 days.

(21) Appl. No.: 16/450,166

(22) Filed: Jun. 24, 2019

(65) Prior Publication Data
US 2019/0310390 A1   Oct. 10, 2019

Related U.S. Application Data

(63) Continuation of application No. 15/503,474, filed as application No. PCT/US2015/045053 on Aug. 13, 2015, now Pat. No. 10,330,821.

(60) Provisional application No. 62/036,711, filed on Aug. 13, 2014.

(51) Int. Cl.
*G01V 8/10*     (2006.01)
*A47K 5/12*     (2006.01)
*A47K 5/00*     (2006.01)

(52) U.S. Cl.
CPC .............. *G01V 8/10* (2013.01); *A47K 5/1217* (2013.01); *A47K 5/00* (2013.01)

(58) Field of Classification Search
CPC .......... G01V 8/10; A47K 5/1217; A47K 5/00
See application file for complete search history.

(56) References Cited

U.S. PATENT DOCUMENTS 8,344,872 B2 *   1/2013   Minckler ......... G07B 17/00661
340/501

FOREIGN PATENT DOCUMENTS

| JP | 2006018480 A | 1/2006 |
|----|--------------|--------|
| JP | 2009025297 A | 2/2009 |
| JP | 2012145545 A | 8/2012 |

OTHER PUBLICATIONS

Corresponding Japanese Application No. 2017-507836, Japanese Office action dated Aug. 9, 2019, 3 pages.

* cited by examiner

*Primary Examiner* — Tony Ko
(74) *Attorney, Agent, or Firm* — Cooper Legal Group LLC

(57) ABSTRACT

Among other things, one or more systems and/or techniques for improving performance of a dispensing system are provided herein. The dispensing system may comprise an emitter and a detector. The emitter may be configured to transmit light (e.g., and/or one or more other signals). The detector may be configured to measure light, for example. The detector may determine a first measurement of light while the emitter is not transmitting light. The detector may determine a second measurement of light responsive to the emitter transmitting light. The detector may determine a third measurement of light based upon a comparison of the first measurement of light with the second measurement of light. The detector may be direct current (DC) coupled while determining the third measurement of light.

20 Claims, 7 Drawing Sheets

SENSOR FOR DISPENSING SYSTEM

CROSS-REFERENCE TO RELATED APPLICATION(S)

This application claims priority to and is a continuation of U.S. application Ser. No. 15/503,474, titled "SENSOR FOR DISPENSING SYSTEM" and filed on Feb. 13, 2017, which is a National Stage Entry of PCT/US2015/045053, titled "SENSOR FOR DISPENSING SYSTEM" and filed on Aug. 13, 2015, which is a non-provisional filing of and claims priority to U.S. Provisional Application 62/036,711, titled "SENSOR FOR DISPENSING SYSTEM" and filed on Aug. 13, 2014. U.S. application Ser. No. 15/503,474, PCT/US2015/045053, and U.S. Provisional Application 62/036,711 are incorporated herein by reference.

TECHNICAL FIELD

The instant application is generally directed towards a dispensing system for dispensing a material, such as a liquid, powder, aerosol, or other types of materials. For example, the instant application is directed to a sensor, for a dispensing system, that utilizes light for triggering the dispensing system.

BACKGROUND

Many locations, such as hospitals, factories, restaurants, homes, etc., utilize dispensing systems to dispense material. For example, a dispensing system may dispense a liquid material, powder material, aerosol material, and/or other materials (e.g., soap, anti-bacterial gels, cleansers, disinfectants, lotions, etc.). Some dispensing systems utilize a sensor to determine when to dispense material.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for improving performance of a (e.g., dispensing) system are provided herein. In some embodiments, the system may comprise an emitter. The emitter may be configured to transmit light (e.g., and/or one or more other signals). In some embodiments, the system may comprise a detector. The detector may be configured to measure light, for example. The detector may determine a first measurement of light while the emitter is not transmitting light. The detector may be alternating current (AC) coupled while determining the first measurement of light. The detector may determine a second measurement of light responsive to the emitter transmitting light. The detector may be AC coupled while determining the second measurement of light. The detector may determine a third measurement of light based upon a comparison of the first measurement of light with the second measurement of light. For example, when the comparison indicates that a difference between the first measurement of light and the second measurement of light is less than a threshold, the third measurement of light may be determined. It may be appreciated that the comparison may indicate a probability that the detector is unable to discern light transmitted from the emitter from ambient light. The detector may be direct current (DC) coupled while determining the third measurement of light.

The following description and annexed drawings set forth certain illustrative aspects and implementations. These are indicative of but a few of the various ways in which one or more aspects can be employed. Other aspects, advantages, and novel features of the disclosure will become apparent from the following detailed description when considered in conjunction with the annexed drawings.

DETAILED DESCRIPTION

Figure 1:
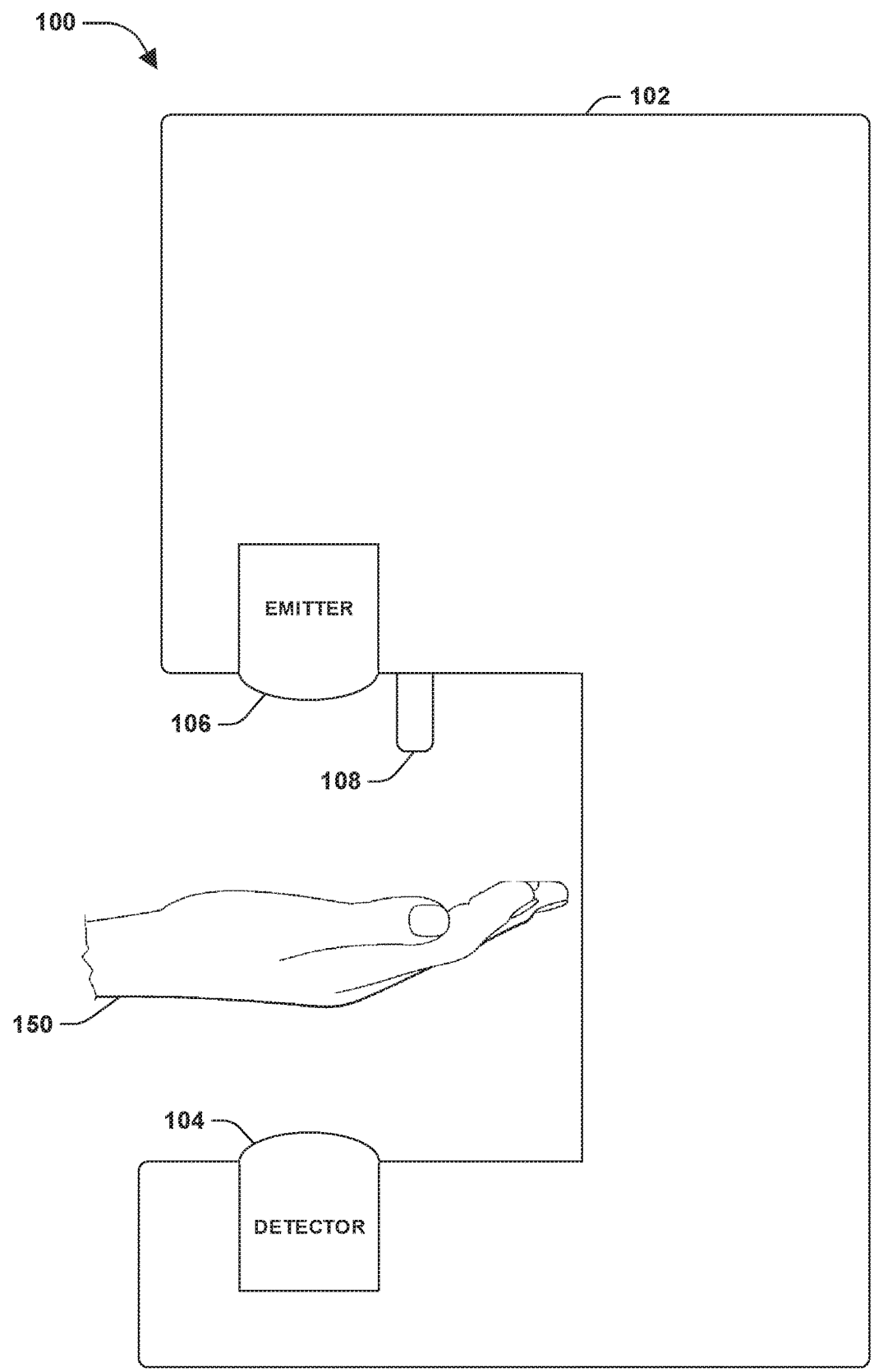
FIG. 1 is a component block diagram illustrating a dispensing system, according to some embodiments.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter.

FIG. 1 illustrates an example of a dispensing system 100 for dispensing a material. The dispensing system 100 may comprise a housing 102 configured to hold a detector 104 and an emitter 106. The detector 104 and the emitter 106 may, in combination, operate as a sensor to determine when to perform a dispense event. For example, the emitter 106 may be configured to transmit light, and the detector 104 may be configured to detect at least some of the light transmitted by the emitter 106. The light may be transmitted at a first frequency (e.g., the emitter 106 may transmit light every 50 microseconds). When the detector 104 detects at least some of the light transmitted by the emitter 106 (e.g., within a threshold amount of time), a determination may be made that a dispense event does not need to be performed. When the detector 104 does not detect at least some of the light transmitted by the emitter 106 (e.g., within the threshold amount of time), the dispense event may be performed. The detector 104 may not detect at least some of the light transmitted by the emitter 106 due to a hand 150 (e.g., or other body part of a user) blocking the light transmitted from the emitter 106 and thereby blocking the light transmitted from the emitter 106 from reaching the detector 104. The dispense event may comprise dispensing material via a dispenser nozzle 108 of the dispensing system 100 (e.g., onto the hand 150).

The housing 102 may comprise various mechanical and/or electrical components that facilitate operation of the dispensing system 100, such as one or more components that dispense material. For example, the housing 102 may comprise a motor and/or a gear train used to dispense material during the dispense event. During the dispense event, the dispenser nozzle 108, the motor, the gear train, and/or other components may dispense material, where any one or more of which may be powered, at least in part, by a traditional power source (e.g., power from an outlet or a battery) and/or by thermal energy harvested from a user.

It may be appreciated that in some embodiments, the detector 104 may not be able to detect at least some of the light transmitted by the emitter 106, even if the hand 150 does not block the light transmitted from the emitter 106 from reaching the detector 104. For example, if ambient light (e.g., sunlight, light from a nearby light bulb, etc.) shines on the detector 104, one or more photodiodes of the detector 104 may become saturated and/or the detector 104 may become unable to detect at least some of the light transmitted by the emitter 106. It may be appreciated that in some embodiments, the inability of the detector 104 to detect at least some of the light transmitted by the emitter 106 may cause the dispense event to be performed when the dispense event may not be desired. For example, the dispense event may be performed even though the hand 150 is not located near the dispenser nozzle 108, which may cause the dispenser nozzle 108 to dispense material on the housing 102 and/or on the detector 104. The performance of the dispense event due to a "false positive" caused by the inability of the detector 104 to detect at least some of the light transmitted by the emitter 106 may be wasteful (e.g., of material) as well as inconvenient (e.g., messy), and therefore may be undesirable.

Figure 2:
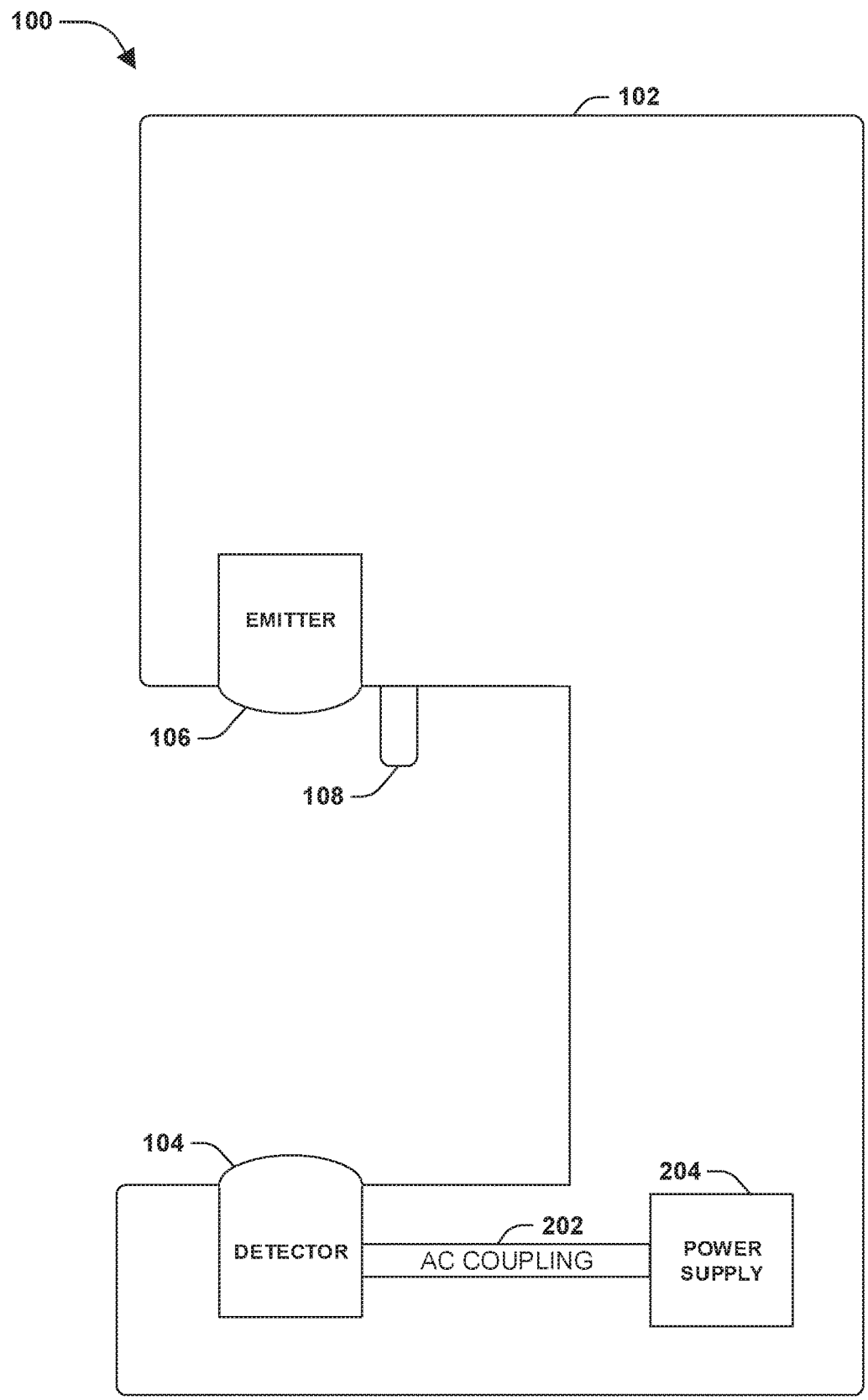
FIG. 2 is a component block diagram illustrating a dispensing system, according to some embodiments.

FIG. 2 illustrates an example of an implementation of the dispensing system 100 which may be used to determine whether the detector 104 is able or unable to discern light transmitted from the emitter 106 from ambient light. As in FIG. 1, the dispensing system 100 may comprise the housing 102, the detector 104, the emitter 106 and the dispenser nozzle 108. The dispensing system 100 may also comprise a power supply 204. The detector 104 may be coupled to the power supply 204. In some embodiments, the detector 104 may be connected to the power supply 204 via an analog-to-digital converter (ADC). The detector 104 may be alternating current (AC) coupled 202. The detector 104 may determine a first measurement of light. The first measurement of light may be determined while the emitter 106 is not transmitting light. The first measurement of light may be determined while the detector 104 is AC coupled 202.

Figure 3:
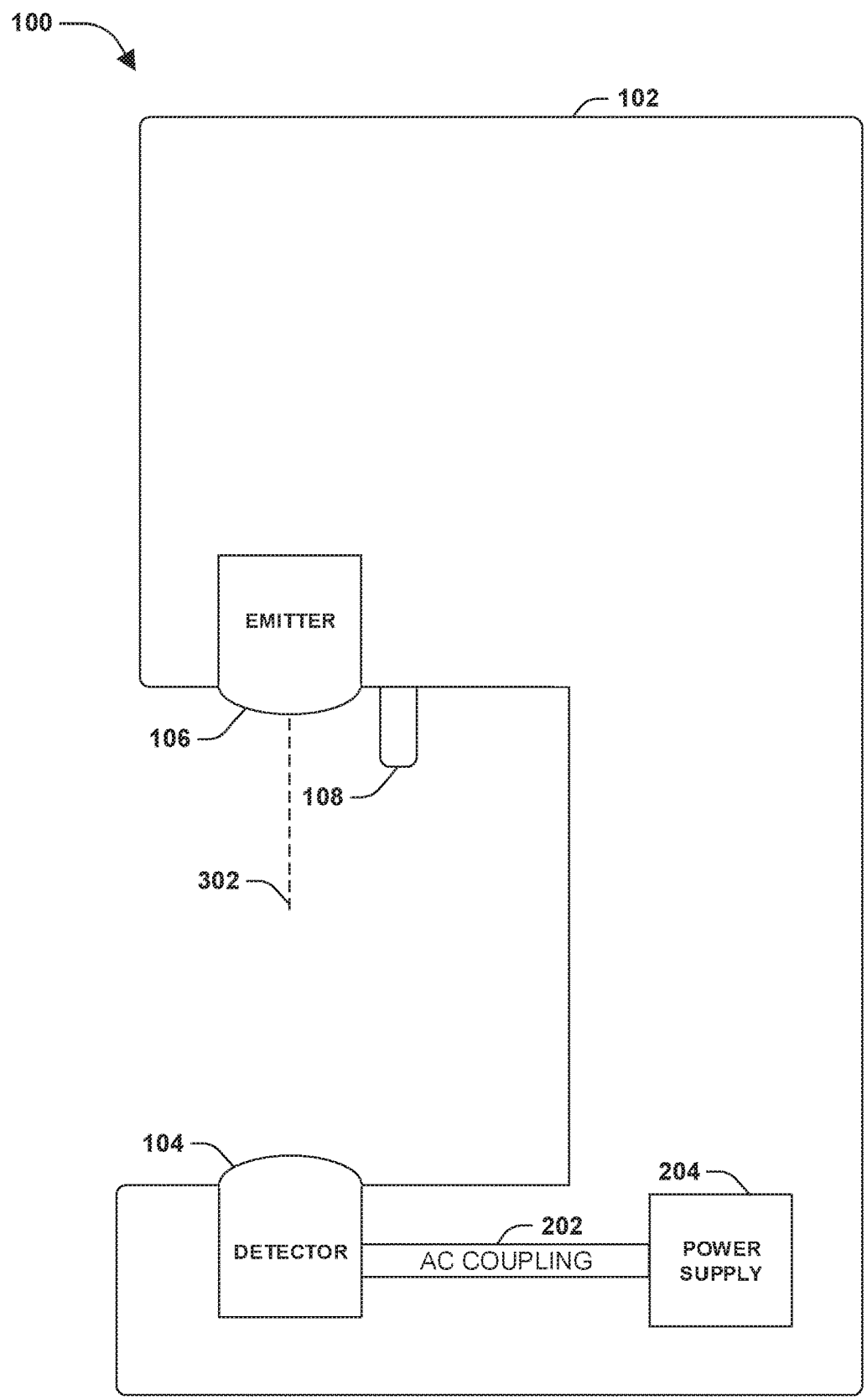
FIG. 3 is a component block diagram illustrating a dispensing system, according to some embodiments.

FIG. 3 illustrates an example of an implementation of the dispensing system 100 which may be used to determine whether the detector 104 is able or unable to discern light transmitted from the emitter 106 from ambient light. As in FIG. 2, the dispensing system 100 may comprise the housing 102, the detector 104, the emitter 106, the dispenser nozzle 108 and the power supply 204. The emitter 106 may transmit light 302. The detector 104 may determine a second measurement of light. The second measurement of light may be determined responsive to the emitter 106 transmitting the light 302. The second measurement of light may be determined while the detector 104 is AC coupled 202.

Figure 4:
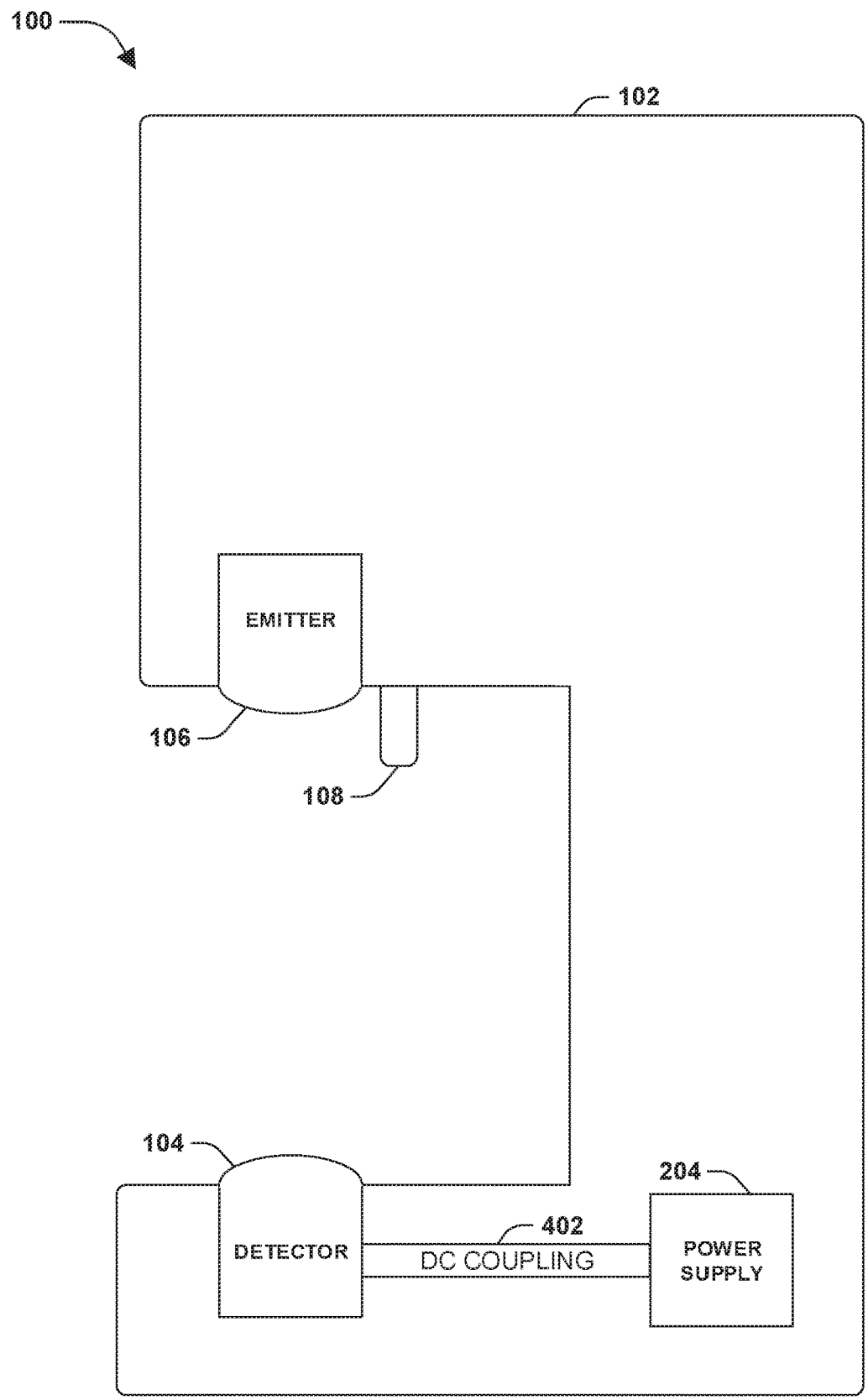
FIG. 4 is a component block diagram illustrating a dispensing system, according to some embodiments.

FIG. 4 illustrates an example of an implementation of the dispensing system 100 which may be used to determine whether the detector 104 is able or unable to discern light transmitted from the emitter 106 from ambient light. As in FIG. 3, the dispensing system 100 may comprise the housing 102, the detector 104, the emitter 106, the dispenser nozzle 108 and the power supply 204. The detector 104 may determine a third measurement of light. The third measurement of light may be determined while the emitter 106 is not transmitting light. Alternatively, the third measurement of light may be determined responsive to the emitter 106 transmitting light. The third measurement of light may be determined while the detector 104 is direct current (DC) coupled 402.

The third measurement of light may be determined based upon a comparison of the first measurement of light with the second measurement of light. For example, the third measurement of light may be determined when the comparison indicates that a difference between the first measurement of light and the second measurement of light is less than a threshold. In another example, if the comparison indicates that the difference between the first measurement of light and the second measurement of light exceeds the threshold, the third measurement of light may not be determined.

It may be appreciated that the comparison may indicate that a probability that the detector 104 is unable to discern light transmitted from the emitter 106 from ambient light may exceed a probability threshold, for example, if the comparison indicates that a difference between the first measurement of light and the second measurement of light is less than the threshold. Based on this possible inability to discern light transmitted from the emitter 106 from ambient light, the third measurement may be determined to be useful. For example, the third measurement may be used to determine with greater accuracy and/or confidence whether the detector 104 is likely to be unable to discern light transmitted from the emitter 106 from ambient light. The comparison may indicate that the probability that the detector 104 is unable to discern light transmitted from the emitter 106 from ambient light may be less than the probability threshold, for example, if the comparison indicates that the difference between the first measurement of light and the second measurement of light exceeds the threshold. When the probability that the detector 104 is unable to discern light transmitted from the emitter 106 from ambient light is less than the probability threshold, the third measurement of light may be determined to be unnecessary, and may therefore not be determined (e.g., to conserve power, etc.), for example.

Once the third measurement of light is determined, a (e.g., conclusive) determination may be made as to whether the detector 104 is able or unable to discern light transmitted from the emitter 106 from ambient light. For example, the third measurement may be used to determine if an absence of an (e.g., expected) signal associated with the detector 104 is due to saturation of the detector 104 with the ambient light. In some examples, the third measurement of light may indicate that the ambient light exceeds a brightness threshold. Responsive to the third measurement of light indicating that the ambient light exceeds the brightness threshold, a determination may be made that the detector 104 is (e.g., probably) unable to discern light transmitted from the emitter 106 from ambient light. As a result, the dispensing system 100 may disable performance of one or more dispense events (e.g., for a set period of time, until a determination is made that the detector 104 is able to discern light transmitted from the emitter 106 from ambient light, etc.). Responsive to the third measurement of light indicating that the ambient light does not exceed the brightness threshold, a determination may be made that the detector 104 is (e.g., probably) able to discern light transmitted from the emitter 106 from ambient light. As a result, the dispensing system 100 may not disable performance of one or more dispense events.

Figure 5:
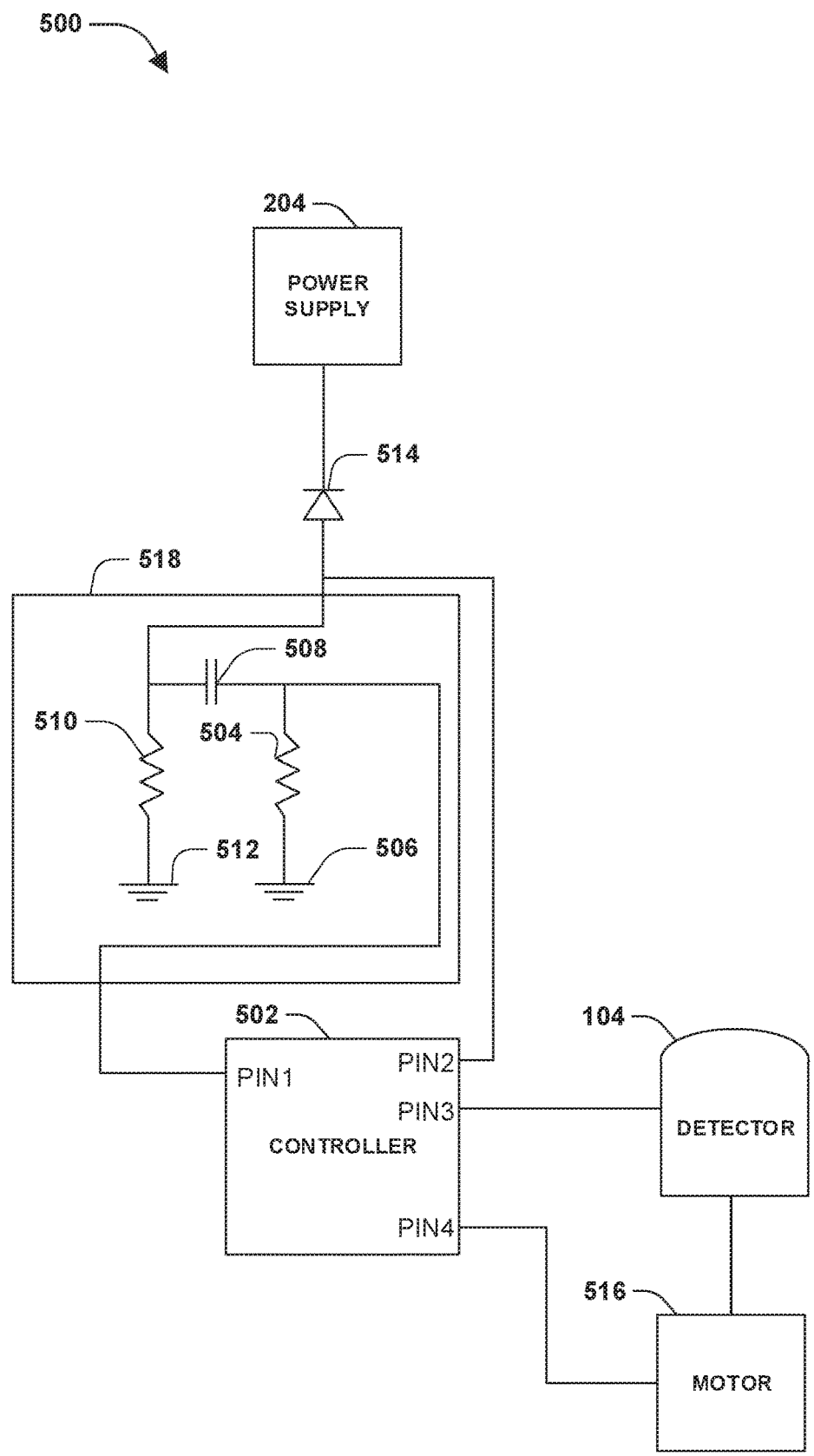
FIG. 5 is a component block diagram illustrating a dispensing system, according to some embodiments.

FIG. 5 illustrates an example of a dispensing system 500. The system 500 may comprise the detector 104, the power supply 204, a controller 502, an AC coupling component 518, a resistor 504, a voltage source 506, a capacitor 508, a resistor 510, a voltage source 512, a diode 514 and/or a motor 516. The controller 502 may be associated with the detector 104. The controller 502 may comprise a microcontroller. The controller 502 may comprise one or more pins, which may comprise pin1, pin2, pin3 and/or pin4.

Pin1 of the controller 502 may be connected to the AC coupling component 518. The AC coupling component 518 may comprise the resistor 504, the voltage source 506, the capacitor 508, the resistor 510 and/or the voltage source 512. Pin1 of the controller 502 may be connected to the resister 504 and/or the capacitor 508. The resistor 504 may be connected to the voltage source 506 and/or the capacitor 508. The voltage source 506 may be ground. The capacitor 508 may be connected to the resistor 510 and/or the diode 514. The resistor 510 may be connected to the voltage source 512 and/or the diode 514. The voltage source 512 may be ground. The diode 514 may be connected to the power supply 204. In some embodiments, the diode 514 may serve as the detector 104. In some embodiments, when the diode 514 serves as the detector 104, the diode 514 may be connected to the power supply 204 via an ADC. It may be appreciated that the connection of pin1 of the controller 502 to the power supply 204 via and/or in association with the AC coupling component 518 may provide for an AC coupling (e.g., of the controller 502 and/or the detector 104). It may be appreciated that the connection of pin1 of the controller 502 to the power supply 204 via and/or in association with the resistor 504, the voltage source 506, the capacitor 508, the resistor 510, the voltage source 512 and/or the diode 514 may provide for an AC coupling (e.g., of the controller 502 and/or the detector 104).

Pin2 of the controller 502 may be connected to the diode 514, the capacitor 508 and/or the resistor 510. The diode 514 may be connected to the power supply 204. It may be appreciated that the connection of pin2 of the controller 502 to the power supply 204 via and/or in association with the diode 514 may provide for a DC coupling (e.g., of the controller 502 and/or the detector 104).

Pin3 of the controller 502 may be connected to the detector 104. Pin4 of the controller 502 may be connected to the motor 516. The detector 104 may be connected to the motor 516. In some embodiments, Pin3 may be connected to (e.g., drive) the emitter 106 (e.g., rather than the detector 104). The emitter 106 may or may not be connected to the motor 516. It may be appreciated that in some examples, when the first measurement of light is determined (e.g., as discussed in association with FIG. 2) and/or when the second measurement of light is determined (e.g., as discussed in association with FIG. 3), Pin1 of the controller 502 may be used to AC couple the controller 502 and/or the detector 104. It may be appreciated that in some examples, when the third measurement of light is determined (e.g., as discussed in association with FIG. 4), Pin2 of the controller 502 may be used to DC couple the controller 502 and/or the detector 104. In some examples, when Pin1 is used, Pin2 may not be used. In some examples, when Pin2 is used, Pin1 may not be used. In some examples, Pin1 and Pin2 may be used concurrently. The motor 516 may be used to dispense material during a dispense event.

Figure 6:
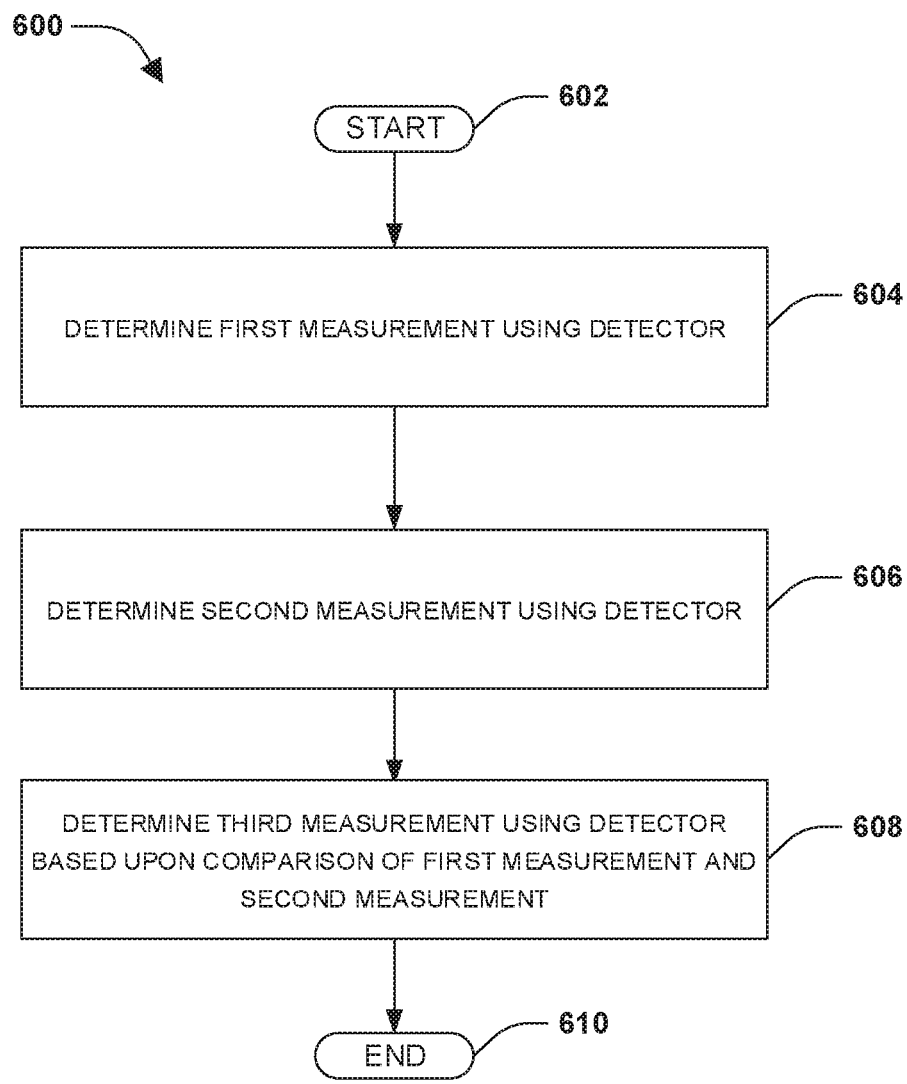
FIG. 6 is a flow diagram illustrating a method of determining measurements using a detector, according to some embodiments.

FIG. 6 illustrates an example of a method 600. The method 600 starts at 602. At 604, a first measurement of light may be determined. The first measurement of light may be determined while an emitter is not transmitting light. The first measurement of light may be determined using a detector. The first measurement of light may be determined while the detector is AC coupled. At 606, a second measurement of light may be determined. The second measurement of light may be determined responsive to the emitter transmitting light. For example, the second measurement of light may be determined while the emitter is transmitting light, and not while the emitter is not transmitting light. The second measurement of light may be determined using the detector. The second measurement of light may be determined while the detector is AC coupled. It may be appreciated that the first measurement of light may be determined before the second measurement of light is determined.

At 608, a third measurement of light may be determined. The third measurement of light may be determined based upon a comparison of the first measurement of light with the second measurement of light. For example, the third measurement of light may be determined when the comparison indicates that a difference between the first measurement of light and the second measurement of light is less than a threshold. In another example, if the comparison indicates that the difference between the first measurement of light and the second measurement of light exceeds the threshold, the third measurement of light may not be determined. The third measurement of light may be determined using the detector. The third measurement of light may be determined while the detector is DC coupled. It may be appreciated that the second measurement of light may be determined before the third measurement of light is determined. It may further be appreciated that the first measurement of light may be determined before the third measurement of light is determined. The method 600 ends at 610.

It may be appreciated that a transfer of signals of a device may depend on whether the device is AC coupled or DC coupled. For example, if a device is AC coupled, the device may be associated with a transfer of (e.g., merely) AC signals (e.g., and not DC signals). In another example, if the device is DC coupled, the device may be associated with a transfer of AC signals and/or DC signals.

Figure 7:
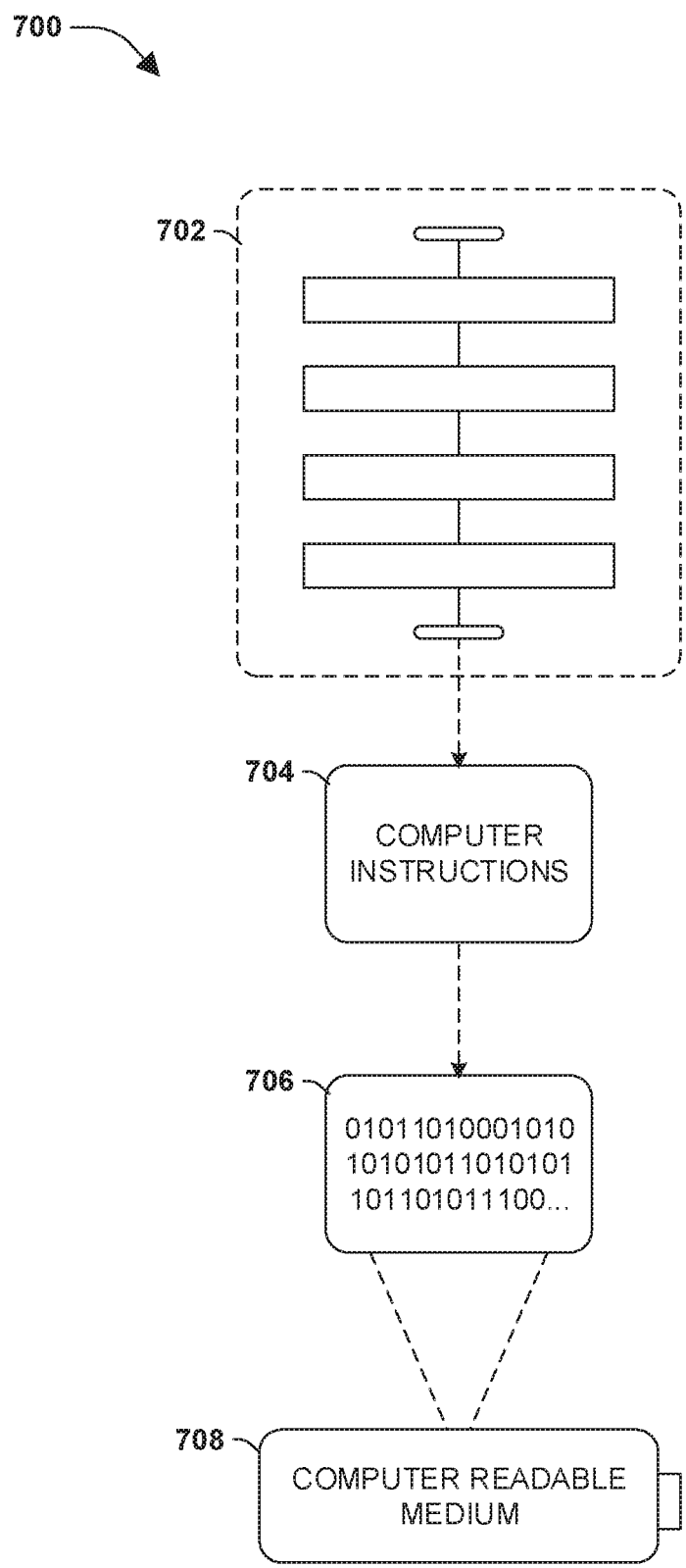
FIG. 7 is an illustration of an example computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 7, wherein the implementation 700 comprises a computer-readable medium 708, such as a CD-R, DVD-R, flash drive, a platter of a hard disk drive, etc., on which is encoded computer-readable data 706. This computer-readable data 706, such as binary data comprising at least one of a zero or a one, in turn comprises a set of computer instructions 704 configured to operate according to one or more of the principles set forth herein. In some embodiments, the processor-executable computer instructions 704 are configured to perform a method 702, such as at least some of the exemplary method 600 of FIG. 6, for example. In some embodiments, the processor-executable instructions 704 are configured to implement a system, such as at least some of the exemplary system 100 of FIG. 1, at least some of the exemplary system 200 of FIG. 2, at least some of the exemplary system 300 of FIG. 3, at least some of the exemplary system 400 of FIG. 4 and/or at least some of the exemplary system 500 of FIG. 5, for example. Many such computer-readable media are devised by those of ordinary skill in the art that are configured to operate in accordance with the techniques presented herein.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and/or advantageous for any given or particular application.

What is claimed is:

1. A system, comprising:
   an emitter configured to transmit light; and
   a detector configured to:
     determine a first measurement of light while the emitter is not transmitting light;
     determine a second measurement of light, responsive to the emitter transmitting light;
     determine a probability that the detector is unable to discern light transmitted from the emitter from ambient light based upon a plurality of measurements of light comprising:
       the first measurement of light determined while the emitter is not transmitting light; and
       the second measurement of light determined responsive to the emitter transmitting light; and
     responsive to the probability that the detector is unable to discern light transmitted from the emitter from ambient light exceeding a probability threshold, determine a third measurement of light.

2. The system of claim 1, the detector configured to determine the third measurement of light when a difference between the first measurement of light and the second measurement of light is less than a threshold.

3. The system of claim 1, the detector configured to determine the first measurement of light at a first time and the second measurement of light at a second time after the first time, wherein the emitter is not transmitting light at the first time and is transmitting light at the second time.

4. The system of claim 1, comprising a component configured to determine that the detector is unable to discern light transmitted from the emitter from ambient light responsive to the third measurement of light indicating that the ambient light exceeds a brightness threshold.

5. The system of claim 1, the detector associated with a transfer of merely alternating current (AC) signals while the detector is AC coupled.

6. The system of claim 1, the detector associated with a transfer of alternating current (AC) signals and direct current (DC) signals while the detector is DC coupled.

7. The system of claim 1, comprising a component configured to enable an event responsive to determining, based upon the third measurement of light, that the detector is able to discern light transmitted from the emitter from ambient light.

8. The system of claim 7, the event comprising a dispense event.

9. The system of claim 1, comprising a component configured to perform an event based upon a fourth measurement of light determined by the detector.

10. A method, comprising:
    determining a first measurement of light, while an emitter is not transmitting light, using a detector;
    determining a second measurement of light, responsive to the emitter transmitting light, using the detector; and
    determining a third measurement of light, based upon a comparison of the first measurement of light with the second measurement of light, using the detector while the detector is direct current (DC) coupled, wherein the second measurement of light is different than the first measurement of light.

11. The method of claim 10, the determining a third measurement of light performed when the comparison indicates that a difference between the first measurement of light and the second measurement of light is less than a threshold.

12. The method of claim 10, the determining a third measurement of light performed when the comparison indicates that a probability that the detector is unable to discern light transmitted from the emitter from ambient light exceeds a probability threshold.

13. The method of claim 10, comprising suspending an event responsive to determining, based upon the third measurement of light, that the detector is unable to discern light transmitted from the emitter from ambient light.

14. The method of claim 10, comprising enabling an event responsive to determining, based upon the third measurement of light, that the detector is able to discern light transmitted from the emitter from ambient light.

15. A computer readable medium comprising instructions that when executed, perform a method comprising:
    determining a first measurement of light, while an emitter is not transmitting light, using a detector;

determining a second measurement of light, responsive to the emitter transmitting light, using the detector; and determining a third measurement of light, based upon a comparison of the first measurement of light with the second measurement of light, using the detector, wherein the determining a first measurement of light is performed at a different time than the determining a second measurement of light.

16. The computer readable medium of claim 15, the determining a first measurement of light performed before the determining a second measurement of light.

17. The computer readable medium of claim 15, the determining a second measurement of light performed before the determining a third measurement of light.

18. The computer readable medium of claim 15, the determining a first measurement of light performed before the determining a third measurement of light.

19. The computer readable medium of claim 15, the determining a third measurement of light performed when the comparison indicates that a difference between the first measurement of light and the second measurement of light is less than a threshold.

20. The computer readable medium of claim 15, the determining a third measurement of light performed when the comparison indicates that a probability that the detector is unable to discern light transmitted from the emitter from ambient light exceeds a probability threshold.

\* \* \* \* \*